No. 896,959. PATENTED AUG. 25, 1908.
F. TYSON.
PASTEURIZING APPARATUS.
APPLICATION FILED NOV. 2, 1906.

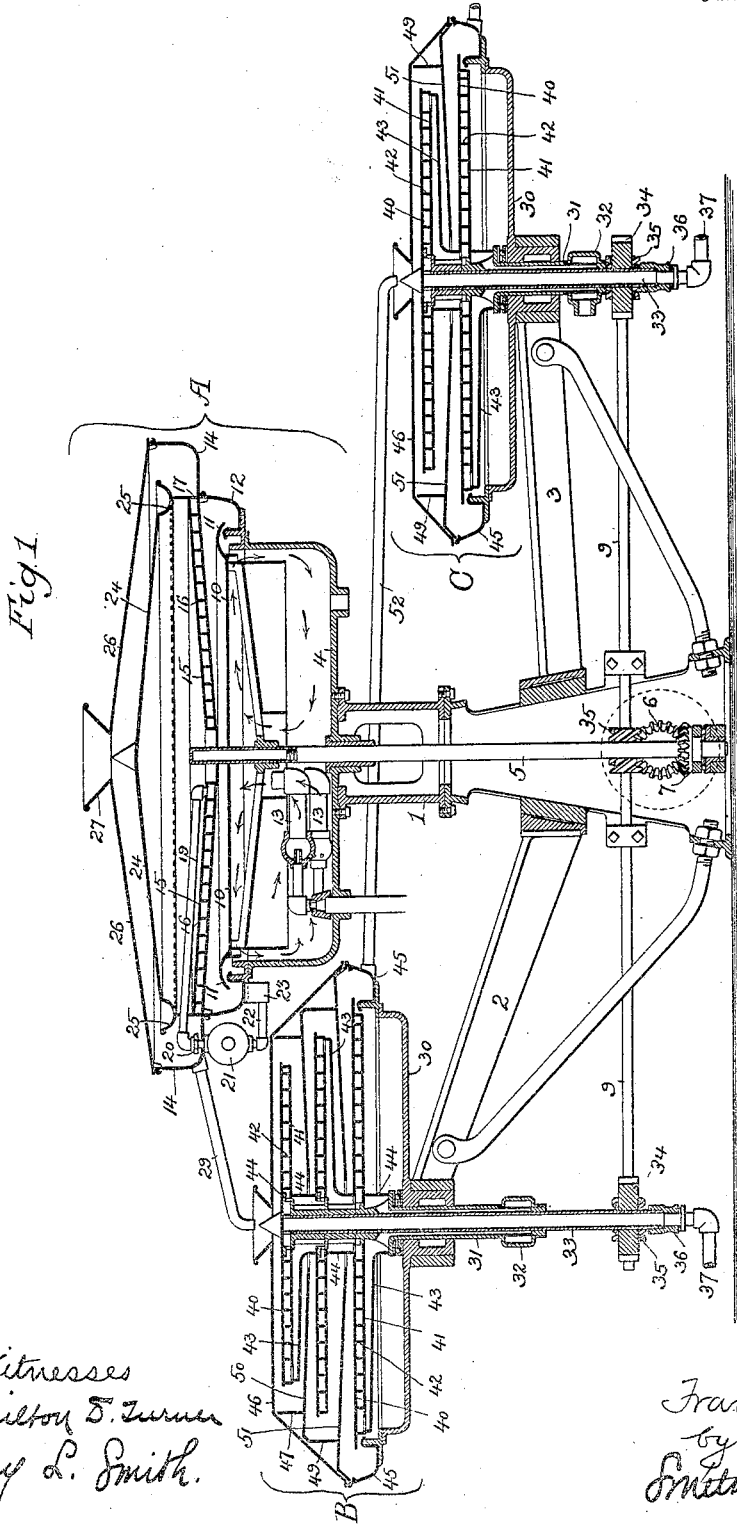

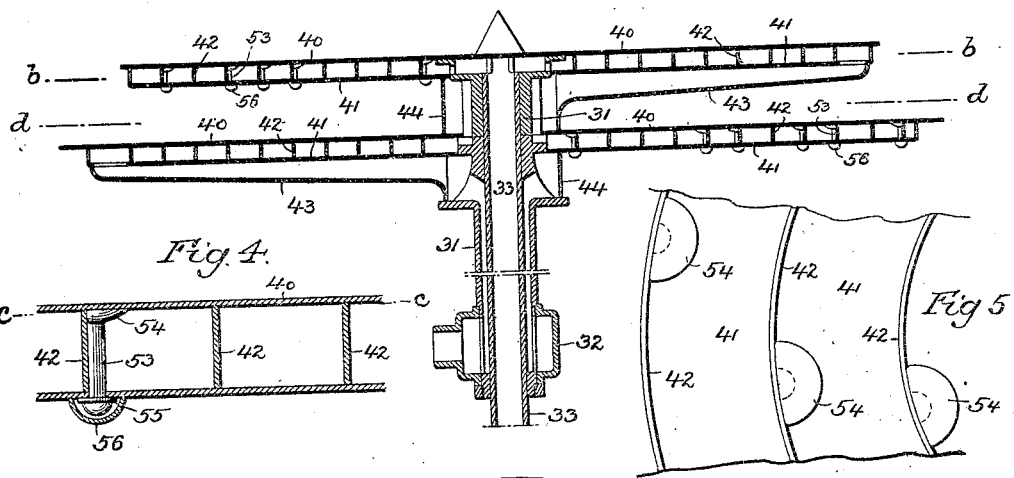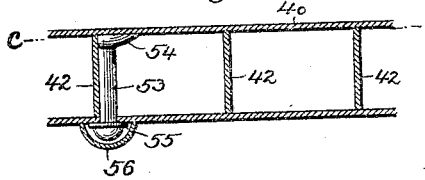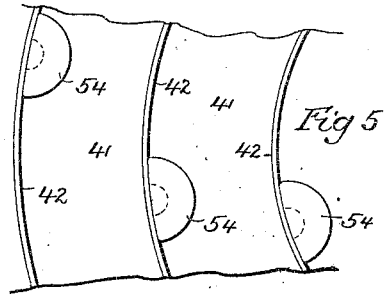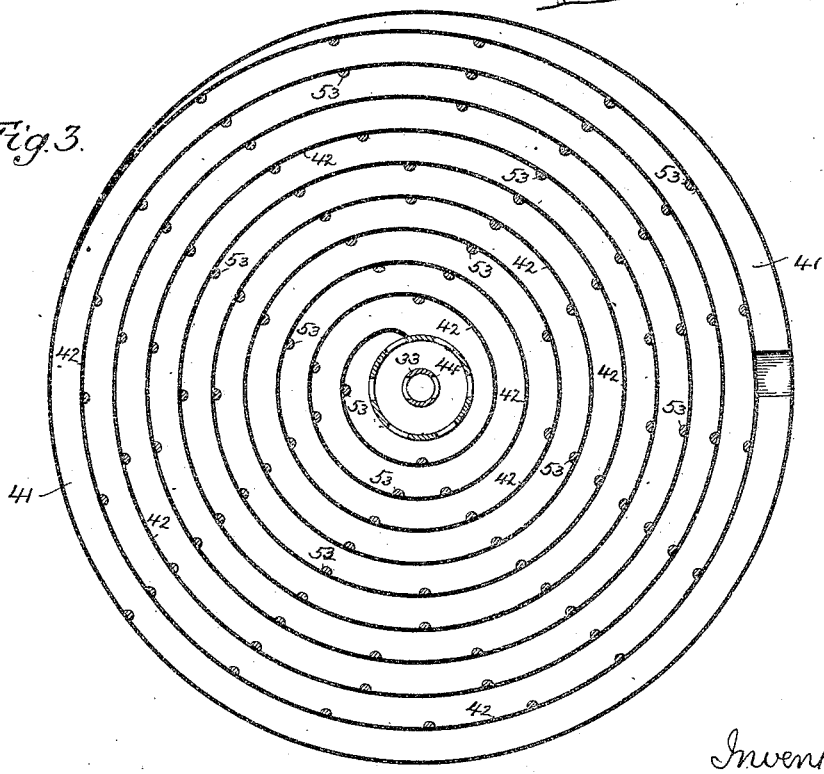

3 SHEETS—SHEET 3.

Witnesses
Hamilton D. Turner
Harry L. Smith.

Inventor
Frank Tyson
by his attorneys
Smith & Frazier

UNITED STATES PATENT OFFICE.

FRANK TYSON, OF CANTON, OHIO.

PASTEURIZING APPARATUS.

No. 896,959.  Specification of Letters Patent.  Patented Aug. 25, 1908.

Application filed November 2, 1906. Serial No. 341,749.

*To all whom it may concern:*

Be it known that I, FRANK TYSON, a citizen of the United States, residing in Canton, Ohio, have invented certain Improvements in Pasteurizing Apparatus, of which the following is a specification.

My invention consists of certain improvements in that type of pasteurizing apparatus which is shown in my Letters Patent No. 853,659, dated May 14, 1907, one object of my present invention being to effectively utilize the heat of the liquid which is being pasteurized for the purpose of causing a preliminary partial heating of the incoming supply of liquid before the latter is fed to the rotating disk constituting the main heating member of the apparatus, a further object being to increase the capacity of the coolers without material increase in the bulk of the same, and a still further object being to insure the full effect of the agent employed to cool or heat the surface over which the liquid to be pasteurized is caused to flow. These objects I attain in the manner hereinafter set forth, reference being had to the accompanying drawings, in which:—

Figure 6:
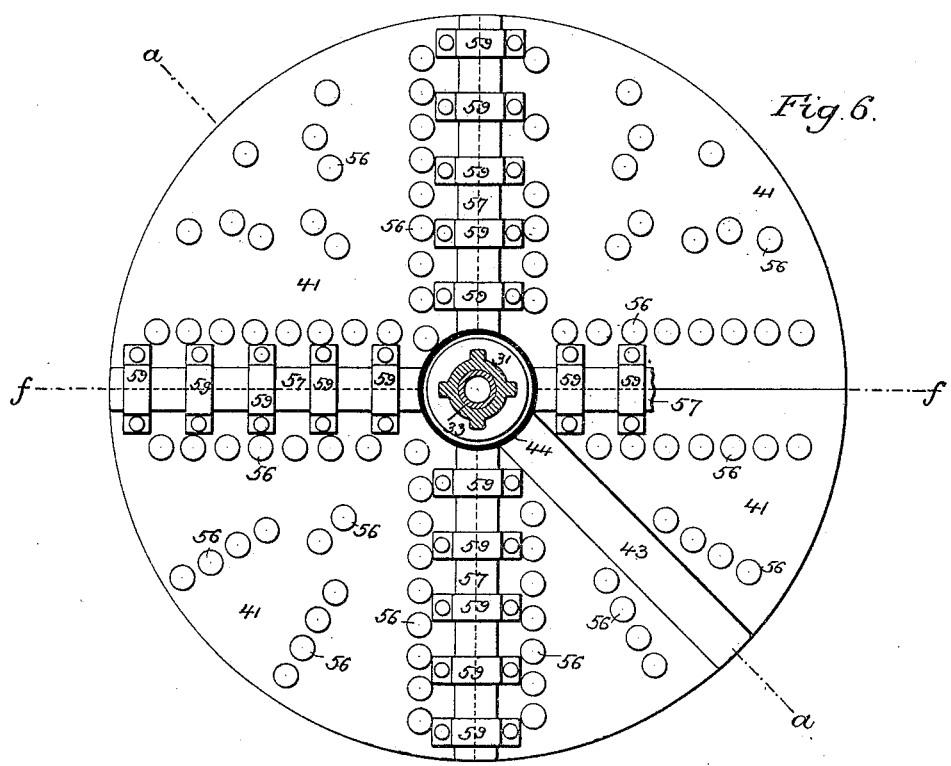
Figure 7:
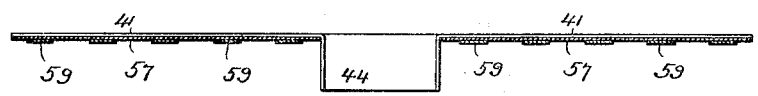

Figure 1 is a longitudinal section of a pasteurizing apparatus constructed in accordance with my invention; Fig. 2 is an enlarged section, on the line $a-a$, Fig. 6, of part of one of the coolers of said pasteurizing apparatus; Fig. 3 is a horizontal sectional view on the line $b-b$, Fig. 2; Fig. 4 is an enlarged vertical section of part of the structure shown in Fig. 2; Fig. 5 is a horizontal sectional view on the line $c-c$, Fig. 4; Fig. 6 is an inverted horizontal section on the line $d-d$, Fig. 2, and Fig. 7 is a section on the line $f-f$, Fig. 6, but showing the parts in their proper position as indicated in Figs. 1 and 2.

Referring, in the first instance, to Fig. 1 of the drawing, A represents the heater of the apparatus, B the first cooler, and C the final cooler, the heater A being mounted upon the top of a central hollow post or standard 1, and the two coolers being carried, respectively, by arms 2 and 3, which project in opposite directions from said central hollow post or standard, and are rigidly secured thereto.

The heater comprises a bowl-shaped vessel 4, mounted upon the upper end of the hollow post 1 and having a central bearing for a vertical shaft 5, which is also adapted to a bearing at the lower portion of the hollow post and is provided with any suitable means whereby it may be rapidly rotated. In the present instance, the means employed are a bevel pinion 6 on the driving shaft, this pinion meshing with a bevel wheel 7 on the shaft 5.

Secured to the upper portion of the shaft 5 is the centrifugal heating plate or disk 10, whereby, in the operation of the apparatus, heat is applied to the liquid to be pasteurized, said liquid being fed to the central portion of the disk, being caused, by centrifugal action, to flow over the surface of the disk, and being finally discharged over the curved rim 11 into an annular trough 12 surrounding the disk. The heating of this liquid is effected by means of water or other available fluid contained in the chamber within the vessel 4 and caused to circulate in contact with the underside of the disk 10, as indicated by the arrows in Fig. 1, such circulation being due partly to centrifugal force and partly to the action of injectors 13 operated by steam or other heating fluid under pressure, as fully set forth in my former application.

Mounted upon the trough 12, so as to be readily removable therefrom, is another trough 14 having an inclined double bottom 15, slightly inclined downwardly towards the center and having between its upper and lower members a coiled strip 16 forming a spiral chamber or passage communicating at its outer end with the trough 14, as shown for instance at 17, in Fig. 1, and at its inner end with a pipe 19, whose outer end is connected, by a removable coupling 20, with the discharge pipe of a rotary pump 21, the inlet pipe 22 of the latter communicating with a well 23 which receives the discharge from the trough 12.

Upon an annular flange within the trough 14 is mounted a conical hood 24 surrounded by a trough 25 which is perforated on its inner side, and said trough 14 is also provided with a removable cap or cover 26 with central funnel 27 for receiving the initial supply of the liquid to be pasteurized, said liquid flowing down the conical hood 24 into the trough 25 and being distributed by the latter onto the outer portion of the inclined double bottom of the trough 14 down which it flows to the central discharge opening whereby it is delivered onto the central portion of the rotating heating plate or disk 10, and, after being raised to the proper temperature for pasteurization in its passage over said disk is discharged into the trough 12, and thereafter caused to circulate through the spiral chamber or passage in the double bottom 15, the resultant effect being the partial or preliminary heating of the incoming supply of the liquid, and the partial or preliminary cooling of the heated liquid, the latter being finally discharged into the trough 14, and thence conveyed through a pipe 29 to the first cooler B of the apparatus. This cooler comprises a bowl-shaped vessel 30, mounted upon the arm 2, and carrying a bearing for a tubular shaft 31, which, at its lower end, is mounted so as to be free to rotate in a hollow head 32, the latter receiving the supply of cooling liquid under pressure. Within the hollow shaft 31, and secured to the same at the upper end, is another hollow shaft 33, to which rotating movement is imparted from a longitudinal shaft 9 by means of gears 34 and 35, said shaft 9 being driven by similar gears from the shaft 5. The lower end of the shaft 33 has a head 36 which is so coupled to a fixed discharge pipe 37, that it is free to rotate in fluid-tight contact therewith. In the present instance, the cooler B has three members disposed one above another, all of these cooling members being alike, so that a description of one will suffice for all. Each cooling member consists of an upper disk or plate 40, and a lower disk or plate 41, flanged at its outer edge for connection with the plate 40, so as to form between the two a chamber which is converted into a spiral passage by means of a spirally coiled strip 42, the outer end of said spiral passage communicating with the outer end of a radial duct 43, secured to the under side of the bottom plate 41 and communicating at its inner end with a hollow hub 44 surrounding the shaft 31.

The lowermost hub 44 is in communication with the interior of the hollow shaft 31 and therefore with the hollow head 32 which receives the incoming supply of cooling fluid, the latter being therefore directed, in the first instance, to the outer end of the spiral passage of the lowermost member of the cooler. The inner end of said spiral passage communicates with the hollow hub 44 of the radial duct 43 of the next higher member of the cooler, consequently the cooling fluid, after circulating through the spiral chamber of the lowermost member of the cooler, is directed to the outer end of the spiral chamber of the next higher member, and after circulating through the same is directed into the hollow hub 44 communicating with the radial duct 43 of the uppermost member of the cooler, and, after circulating through the spiral chamber of the latter, is discharged into the hub 44 surrounding the upper end of the hollow shaft 33 through which it takes its course downwardly to the discharge pipe 37.

Mounted upon and surrounding the vessel 30 is a trough 45, and mounted upon the latter are a cap or cover 46 and a partition structure comprising annular flanges 47 and 49, and partition plates 50 and 51, the partition plate 50 being interposed between the uppermost and intermediate members of the cooler, and the partition plate 51 being interposed between the intermediate and lowermost members of the cooler, each partition plate discharging through a central orifice onto the plate or disk 40 of the cooling member below it.

The liquid to be pasteurized flows from the trough 14 through the pipe 29 and is delivered onto the central portion of the disk 40 of the uppermost cooling member, over which it is caused to flow by centrifugal force and is discharged against the flange 47, flowing thence down onto and over the partition plate 50 to the central portion of the intermediate cooling member from which, in turn, it is discharged against the flange 49, and flows down onto and over the partition plate 51 and onto the central portion of the lowermost cooling member, the discharge from the latter being collected in the trough 45 and conveyed therefrom, through a pipe 52, onto the second cooler C, which is constructed in the same manner as the first with the exception that it has, in the present instance, but two cooling members instead of three, although, of course, it will be understood that any desired number of cooling members may be used in either of the coolers as the character of the work to be performed may suggest.

The construction of the individual members of the cooler can be best understood on reference to Figs. 2 to 7. It is necessary that each of said cooling members shall be of relatively rigid construction, in order that it may run true and resist the disruptive effect due to the pressure of the cooling fluid under the action of centrifugal force. For this reason the upper portion of each convolution of the spiral flange 42 is soldered, brazed, or otherwise secured to the underside of the top plate 40 of the cooling member, and stay bolts 53 are disposed at appropriate intervals throughout the entire length of the spiral passage formed between the upper and lower plates of the cooling member, as shown in Fig. 3. Each of these stay bolts has an expanded base 54 soldered, brazed, or otherwise secured to the top plate 40, and the stem of the bolt has a flat side secured in a similar manner to the spiral plate 42, the end of the bolt projecting through an opening in the lower plate 41 and being riveted over a washer 55 on the underside of said plate, in order to firmly secure the two plates 40 and 41 together and insure a tight joint between the under plate and the bottom of the spiral flange 42.

To prevent leakage around the riveted end of each stay bolt and also to prevent contact of the liquid to be pasteurized with the riveted ends of said bolts, which are usually composed of copper, I cover said riveted end with a cap 56 composed of metal which will have no injurious effect upon the liquid under treatment, this cap being hermetically secured to the under side of the bottom plate 41 of the cooling member by soldering, brazing or in any other available way.

In machines having cooling disks or plates of large diameter it is difficult to secure and maintain perfect truth of the plate if the same is composed of a single piece, consequently I make the lower plate of each of the chambered cooling members of a number of sections, as shown in Fig. 6, it being much easier to flatten or straighten a plate of the limited area of one of these sections than it would be to flatten or straighten a plate having the full area.

The meeting edges of the sections fit accurately and are secured together by soldering, brazing, or other effective means, and each joint is further strengthened by means of a radial strip 57 secured to the under side of the plate sections by soldering or brazing, and further secured to each section by means of transverse straps 59 spanning said strip 57, connected thereto, and also riveted at the ends to the adjoining sections of the plate, as shown in Fig. 6.

If desired, the top plate 40 of the cooler may also be made in sections, and the heating element of the machine may, in the same manner as the coolers, comprise a plurality of superposed heating members.

I claim:—

1. The combination, in pasteurizing apparatus, of a rotatable heating member, a non-rotatable preliminary heater for the incoming supply of liquid, and means for circulating the heated liquid through said preliminary heater, the latter surmounting the main heating member.

2. The combination, in pasteurizing apparatus, of a heating member, a preliminary heater surmounting the same and having a double bottom, and means for circulating the heated liquid through said double bottom.

3. The combination, in pasteurizing apparatus, of a heating member, a preliminary heater surmounting the same and having a double bottom with spiral passage therein, and means for circulating the heated liquid through said spiral passage.

4. The combination, in pasteurizing apparatus, of a heating member, a preliminary heater surmounting the same and having a double bottom, means for circulating the heated liquid through said double bottom, and means for discharging the incoming supply of liquid onto the latter.

5. The combination, in pasteurizing apparatus, of a heating member, a preliminary heater surmounting the same and having a double bottom, means for circulating the heated liquid through said double bottom, and an elevated trough surrounding the double bottom and perforated for discharging the incoming liquid onto the same.

6. The combination, in pasteurizing apparatus, of a heating member, a preliminary heater surmounting the same and having a double bottom, means for circulating the heated liquid through said double bottom, and a conical hood which receives the incoming supply of liquid and has a surrounding trough for delivering said liquid onto the double bottom of the heater.

7. The combination, in pasteurizing apparatus, of a rotatable heating member with a non-rotatable preliminary heater surmounting the same and vertically removable therefrom.

8. The combination, in pasteurizing apparatus, of a heating member, a preliminary heater surmounting the same, and a pump which receives the discharge from the said heating member and forces the same through the preliminary heater.

9. The combination, in pasteurizing apparatus, of a heating member, a preliminary heater surmounting the same and vertically removable therefrom, and a pumping device which receives the discharge from the heating member and forces it through the preliminary heater, said pumping device having a detachable coupling which permits removal of part of the same with the preliminary heater.

10. Pasteurizing apparatus having a heater or cooler comprising a plurality of rotating members disposed one above another, and means whereby the liquid to be pasteurized is caused, partly by centrifugal force and partly by gravity, to flow over said heating members in succession from top to bottom.

11. Pasteurizing apparatus having a heater or cooler comprising a plurality of rotating members disposed one above another, and each having means for circulating heating or cooling fluid in contact with the treating plate, and means whereby the liquid to be pasteurized is caused, partly by centrifugal force and partly by gravity, to flow over said heating members in succession from top to bottom.

12. Pasteurizing apparatus having a heater or cooler comprising a plurality of rotating members disposed one above another, each member having a spiral passage through which the heating or cooling agent is caused to flow in contact with the treating plate, and means whereby the liquid to be pasteurized is caused, partly by centrifugal force and partly by gravity, to flow over said heating members in succession from top to bottom.

13. Pasteurizing apparatus having a heater or cooler composed of a plurality of members disposed one above another, and each provided with means for circulating the heating or cooling agent in contact with the treating plate, and a pair of hollow shafts, one surrounding the other, one shaft serving for the inflow of the heating or cooling agent and the other for the discharge of the same.

14. Pasteurizing apparatus having a heater or cooler comprising a plurality of members disposed one above another, and each provided with means for circulating the heating or cooling agent in contact with the treating plate, and means connecting the circulating chamber of each member with that of an adjoining member of the series, and means whereby the liquid to be pasteurized is caused, partly by centrifugal force and partly by gravity, to flow over said heating members in succession from top to bottom.

15. Pasteurizing apparatus having a heater or cooler comprising a plurality of superposed members, each having a spiral passage for circulating the heating or cooling fluid in contact with the treating plate and a connection whereby the inner end of the spiral passage of one member communicates with the outer end of the spiral passage of an adjoining member, and means whereby the liquid to be pasteurized is caused, partly by centrifugal force and partly by gravity, to flow over said heating members in succession from top to bottom.

16. Pasteurizing apparatus having a heater or cooler comprising a plurality of members disposed one above another and each provided with means for circulating the heating or cooling fluid in contact with the treating plate, a connection between the circulating chamber of each member and that of the adjoining member, and a duplex shaft, one member of which serves as a means for conveying the heating or cooling fluid to one of the extreme members of the series, the other conveying the said fluid from the other extreme member of the series.

17. Pasteurizing apparatus having a heater or cooler comprising a plurality of rotating members disposed one above another, and each having means for circulating the heating or cooling fluid in contact with the treating plate, and a rotating shaft, serving to carry the heating or cooling agent to said members, and means whereby the liquid to be pasteurized is caused, partly by centrifugal force and partly by gravity, to flow over said heating members in succession from top to bottom.

18. Pasteurizing apparatus having a heater or cooler comprising a plurality of rotating members disposed one above another, and each having means for circulating the heating or cooling fluid in contact with the treating plate, and a rotating shaft, serving to carry the heating or cooling agent to and from said members, and means whereby the liquid to be pasteurized is caused, partly by centrifugal force and partly by gravity, to flow over said heating members in succession from top to bottom.

19. Pasteurizing apparatus having a heater or cooler comprising a plurality of rotating members disposed one above another, and each having means for circulating the heating or cooling fluid in contact with the treating plate, and a rotating duplex shaft carrying said members, and serving to convey the heating or cooling fluid to and from the same.

20. Pasteurizing apparatus having a heater or cooler comprising a plurality of members disposed one above another, and each having means for circulating the heating or cooling fluid in contact with the treating plate, a rotating duplex shaft carrying said members, and a stationary head for said rotating shaft having a fluid-tight connection therewith.

21. Pasteurizing apparatus having a heater or cooler comprising a plurality of members disposed one above another, and each having means for circulating the heating or cooling fluid in contact with the treating plate, a rotating duplex shaft carrying said members, and fluid-tight connections between each member of said shaft, and a fixed pipe.

In testimony whereof, I have signed my name to this specification, in the presence of two subscribing witnesses.

FRANK TYSON.

Witnesses:
  J. C. MILLER,
  H. B. STEWART.